United States Patent
Kumar et al.

(10) Patent No.: US 6,521,173 B2
(45) Date of Patent: *Feb. 18, 2003

(54) LOW OXYGEN REFRACTORY METAL POWDER FOR POWDER METALLURGY

(75) Inventors: Prabhat Kumar, Framingham, MA (US); Paul Aimone, Bridgewater, MA (US); Robert W. Balliett, Westboro, MA (US); Anthony V. Parise, Nashua, NH (US); Thomas M. Ramlow, Medfield, MA (US); Henning Uhlenhut, Cambridge, MA (US)

(73) Assignee: H.C. Starck, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/906,208

(22) Filed: Jul. 16, 2001

(65) Prior Publication Data

US 2002/0041819 A1 Apr. 11, 2002

Related U.S. Application Data

(63) Continuation-in-part of application No. 09/377,077, filed on Aug. 19, 1999, now Pat. No. 6,261,337.
(60) Provisional application No. 60/223,771, filed on Aug. 8, 2000.

(51) Int. Cl.[7] .................................................. B22F 3/10
(52) U.S. Cl. ........................................... 419/23; 419/38
(58) Field of Search ....................................... 419/23, 38

(56) References Cited

U.S. PATENT DOCUMENTS

| | | | | | |
|---|---|---|---|---|---|
| 4,063,942 A | * | 12/1977 | Lundgren | ..................... | 75/251 |
| 4,069,045 A | * | 1/1978 | Lundgren | ..................... | 75/251 |
| 4,115,107 A | * | 9/1978 | Booz et al. | ................. | 75/0.5 R |
| 4,141,719 A | * | 2/1979 | Hakko | ..................... | 75/0.5 BB |
| 4,209,320 A | * | 6/1980 | Kajinaga et al. | ......... | 75/0.5 BA |
| 5,415,829 A | * | 5/1995 | Ohhashi et al. | ............... | 419/23 |
| 5,618,397 A | * | 4/1997 | Kano et al. | ............ | 204/298.13 |
| 5,800,636 A | * | 9/1998 | Tsukada et al. | ............. | 148/206 |
| 6,261,337 B1 | * | 7/2001 | Kumar | ........................ | 75/255 |

\* cited by examiner

Primary Examiner—Daniel J. Jenkins
(74) Attorney, Agent, or Firm—Joseph C. Gil; Diderico van Eyl

(57) ABSTRACT

A method of making sheet bar and other precursors of formed products to be made by extensive working. The method includes providing a powder metal, preferably under 100 PPM oxygen content of non-spherical particles, compacting the powder into a coherent precursor form of at least 100 pounds, whereby a precursor is provided enabling extended fabrication to a finished product form. The finished product is resistant to breakup in fabrication due to oxide inclusion effect and produces a low oxygen end product. The method can process multiple species of metals that include at least one higher melting metal and one lower melting metal to produce an alloy or micro-composite of the metals as worked, where one metal is preferably a refractory metal (Ta, Nb, W, Wo, Zr, Hf, V and Re). The process is controlled to cause powder of the higher melting metal to be extended into a fibrous form.

20 Claims, 11 Drawing Sheets

LOW OXYGEN REFRACTORY METAL POWDER FOR POWDER METALLURGY

CROSS REFERENCE TO RELATED APPLICATIONS

This application is a continuation-in-part of patent application Ser. No. 09/377,077, entitled Low Oxygen Refractory Metal Powder for Powder Metallurgy filed on Aug. 19, 1999, and also claims priority of Provisional Application Serial No. 60/223,771, entitled Tantalum or Tantalum Alloy Sputtering Targets filed on Aug. 8, 2000, and both of which are incorporated herein by reference.

BACKGROUND OF THE INVENTION

The present invention relates to powders and products of tantalum, niobium, and their alloys having low oxygen contents, and processes for producing the same.

The present invention is also a response to the problem of establishing high purity tantalum wire with under 100 PPM of oxygen impurity for use as an effective lead wire for sintered tantalum powder solid electrolytic capacitors. The invention also involves other metals and usage of such other metals and tantalum in applications other than as lead wires.

Other applications of the present invention include the production of aerospace alloys similar to those fabricated by the processes disclosed by Robert W. Balliett et al in their patents U.S. Pat. No. 5,918,104 issued Jun. 29, 1999 and U.S. Pat. No. 5,940,675 issued Aug. 17, 1999.

The present invention also relates to composite materials and methods of manufacturing the same, the composites including A—B combinations where A is selected from the group consisting of refractory metals (Nb, Ta, W, Mo, Zr, Hf, Re) and their alloys with each other and still further materials and B is selected from lower melting metals including Cu, Al, Ni, Mg and alloys thereof.

The present invention also relates to metal sheets bent into non-planar forms to provide an integral cone, cup angle bent or other shape without welded or otherwise joined seams and more particularly to such non planar sheets mode of refractory metals—Ta, Nb, Ti, Mo, W, Zr, Hf, Re—and more particularly Ta, Nb, including alloys of all the foregoing with each other and/or with other alloying ingredients.

The present invention further relates to sputter deposition coating (sputtering) applying such refractory metals. In sputtering a discharge is created and ions from the discharge bombard a target, often of such refractory metal, and atoms of the metal or even gross particles are pushed off the surface (sputtered) and deposited on a separate substrate. The target may be an electrode participating in forming the discharge and/or accelerating ions to the target surface or may be passive (with other electrodes serving for the discharge/acceleration). Sputter deposition is used in many applications including building up of solid state microelectronic components and integrated circuits, solid state detectors and detector arrays, light emitting diodes and arrays of such.

The invention also relates to usage of such refractory metals (elements, alloys) as containers for high temperature operations, e.g. serving as crucibles or rack mounts or other supports for holding materials to be heated at temperatures above 1,500° C., sometimes above 2,000° C.

The invention also relates to other forms of such refractory metals which are fabricated into parts that are exposed to high temperature and other adverse service condition usage, such as a leading edge of an airplane or missile wing, fin, nose fairing, propeller blade wall, etc. exposed to one or more of temperature, wind, chemicals, vibration and a variety of static and dynamic loads in service usage.

The present invention also relates to production of large sized metal parts (mill products and fabricated parts) produced by extrusion of pre-formed compacts of metal powder to overcome the batch size limitations of conventional powder metallurgy and more particularly to several applications areas or such extrusion processing.

SUMMARY OF THE INVENTION

The invention comprises new powders of tantalum, niobium or alloys of tantalum or niobium having an oxygen content of less than about 300 PPM, preferably below 200 PPM and more preferably below 100 PPM. The invention also comprises a method for producing these powders wherein hydrides of tantalum, niobium or alloy powders are heated in the presence of an oxygen-active metal, such as magnesium.

The present invention comprises mixing of refractory metal powders (one or more of Nb, Ta, Ti, W, Mo, Zr, Hf, Re, preferably Nb or alloys thereof) and lower melting matrix powder (one or more of Cu, Al, Ni, Mg, preferably Cu or alloys thereof) in a mass proportion and selected size ranges and morphology (particularly as the refractory metal) to allow for subsequent mechanical working to a final fibrous or ribbon form.

The powder blend is consolidated and subject to thermomechanical working and can include HIPing, extrusion, hot rolling, swaging, forging and cold work steps such as rolling or wire drawing with or without intermediate or end anneals. The matrix metal is made with low oxygen content to prevent fracture or other breakdown in the course of such working. The oxygen lowering treatment of exposure to alkaline earth (Mg, Ca) and/or hydrogen or hydrogen source (methane, ammonia, hydrides) can be employed.

Preferably the composite combination is a Cu—Nb blend encapsulated in an extrusion can and the thermomechanical working comprises extrusion to effect at least a 5:1, preferably 8:1 extrusion ratio reduction.

The invention also comprises formed powder metal products having oxygen contents less than about 300 PPM, preferably below 200 PPM and more preferably below 100 PPM, formed from tantalum, niobium, and their alloys. Further discovered is a new process for producing formed powder metal products of tantalum, niobium and their alloys, having very low oxygen contents without resistance sintering.

The present invention utilizes a combination and variation of the two lines of very old prior art development outlined above, taken together with the further realization that this is a way to achieve a powder of very fine size with low oxygen usable in mill products/fabricated parts manufacture. Normally the achievement of fine size (and related high surface area) of powder is associated with high oxygen pick-up deleterious to subsequent processing and use.

The object of the invention is achieved as to each of the several application areas (sputtering, crucibles, curved aerodynamically shaped devices, and others) by provision of integrally formed refractory metals of curved sheet forms closed on themselves without use of welds, laps, seams or fasteners in the zone of usage challenge and preferably entirely free of such artifacts. Such shapes may be referred to as pots or seamless pots. They are provided as deep or shallow cups or dish forms, cones (coming to a point or truncated), cylinders or part cylinders or part spheres, corrugated sheets or planar or curved sheets with arrays of curving or conical dimples. The refractory metals may be of elemental or alloy forms and may be free standing or laminated to backup sheets of lower cost or otherwise functional metals (e.g. copper for electrical or thermal conductivity, steel or nickel alloys for structural support, etc.).

One embodiment of the present invention pertains to sputtering targets of refractory metals, and in particular tantalum and tantalum alloys, and methods of their fabrication. These targets are characterized by low oxygen, high density, fine grain-size and extremely high uniformity in all directions, providing heretofore unachievable sputtering performance. The tantalum or tantalum alloy powder is produced according to the method disclosed herein. The powder may be consolidated to a high density by various techniques. The powder may be canned in copper, molybdenum-coated steel or other materials to protect it from contamination as it is consolidated at high temperature. The can may or may not be removed by pickling or machining. The consolidated material may be thermomechanically processed to a sputtering target as disclosed herein or by another method. For economic reasons, it is common practice to bond tantalum sputtering targets to copper plates or other substrates. In the case of powder canned in copper and possibly other materials like molybdenum, using the can which bonds to the target during consolidation as the backing plate may eliminate this bonding step.

A further embodiment of the present invention is the process of making wires via a powder metallurgy route using tantalum hydride powders that are packed into a shell. The powders are loosely filled into the shell and then dehydrided in situ while loosely contained in the shell. The shell is then closed in and used as an extrusion billet to produce a rod which can be used directly or subjected to further size reduction by forging, swaging and/or wire drawing or rolling steps to produce a final wire or sheet mill product and/or formed into a final fabricated part at that time or later. Both the extrusion step and later forming step(s) are made more effective by the original steps of provision of loose hydride powders into a container that will become an extrusion billet, dehydriding in situ and immediately sealing up the billet to prevent oxygen absorption and then extruding. After cooling, the extruded product, i.e. the resultant rod, the original can material now constituting a thin surface layer of the rod can be removed. The term "rod" as used herein includes all sizes of the rod and wire range practically achievable via extrusion as well as all cross-section forms.

It is a principal object of the present invention to provide a method of achieving fine tantalum and/or niobium powder with low oxygen, preferably averaging under 150 micrometer (micron) size and below 300 PPM of oxygen, preferably below 200 PPM and more preferably below 100 PPM.

This is accomplished by providing a fine size of tantalum hydride powder of minus 150 microns and mixing it with a small amount of magnesium or calcium, less than 1/2% of the hydride weight. A precursor of the alkaline earth metal such as a hydride thereof can also be employed. The mixture is heated in a ramping up heating schedule to vaporize the alkaline earth metal and to start reduction of oxygen by the vapor, holding to complete the reaction of oxygen, then cooling, and acid and water washing to leach off residual alkaline earth metal and drying to yield a tantalum powder of low oxygen (typically under 150 PPM) and particle size averaging under 150 microns FAPD (Fisher Average particle Diameter).

An advantage of the powder of the present invention is that it comprises relatively non-spherical particles suited for unidirectional mechanical pressing.

A further advantage of the powder of the present invention is that it comprises relatively small particles well suited for cold isostatic pressing.

An advantage of the formed products of tantalum, niobium or their alloys, of the present invention, is that the products can be of any shape, cross-section or size.

An advantage of the process for producing formed products of the present invention is that the process allows for the production of tantalum, niobium, or alloy formed products having low oxygen content as described above and being of any shape cross-section or size.

In addition to application for Ta, Nb and alloys (Ta—Nb), the invention can also be applied to other refractory metals, e.g., Mo, W, Ti, Zr, Hf, Re and alloys of the same with each other and/or Nb or Ta.

Other objects, features and advantages will be apparent from the following detailed description of preferred embodiments taken in conjunction with the accompanying drawings in which:

DETAILED DESCRIPTION OF PREFERRED EMBODIMENTS

The metal powders of low oxygen content of the present invention are produced via the following procedure.

Figure 1A:
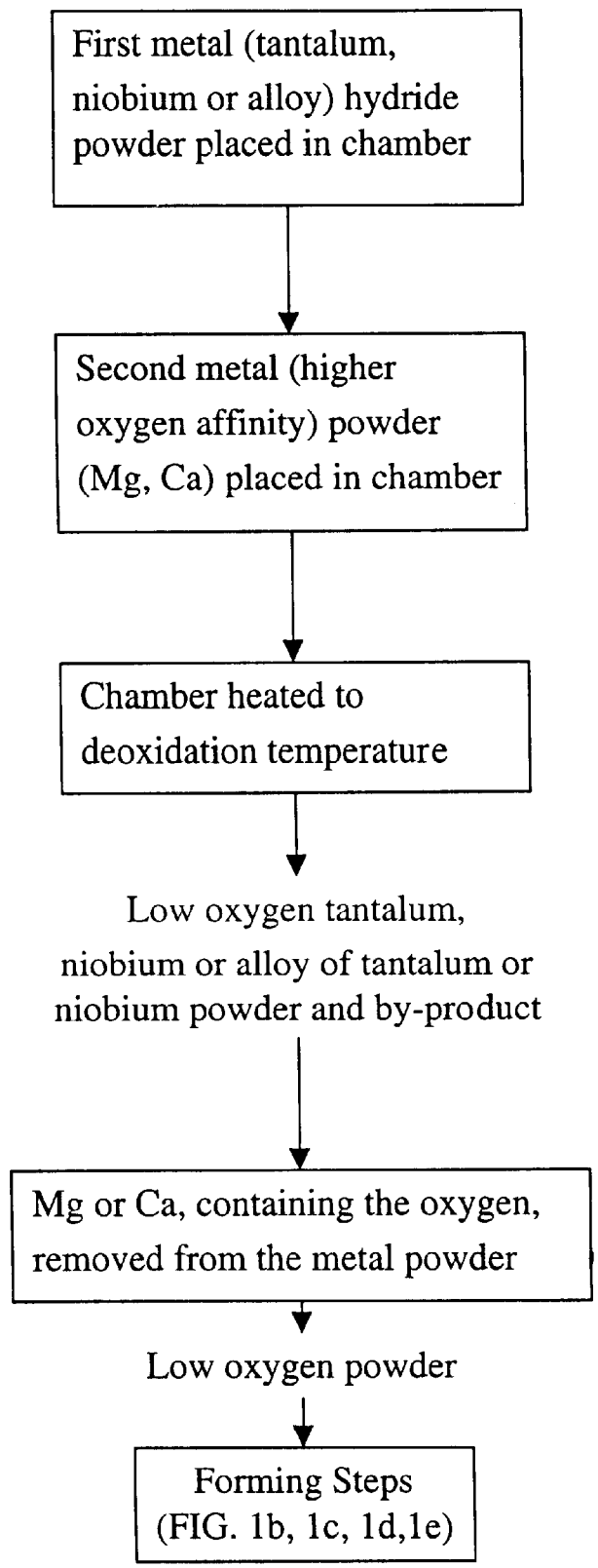
FIG. 1a is a flow chart showing a process of the present invention to create low oxygen powder.

As illustrated in FIG. 1a, a first metal (including refractory metals such as tantalum, niobium or alloy) hydride powder is placed into a vacuum chamber, which also contains a metal having a higher affinity for oxygen than the first metal, such as calcium or magnesium, preferably the latter.

Preferably, the starting hydride powder has oxygen content less than about 1000 PPM. The chamber is then heated to the deoxidation temperature to produce a powder of tantalum, niobium or alloy of tantalum or niobium having a target reduced oxygen content of less than about 300 PPM preferably below 200 PPM and more preferably below 100 PPM. The magnesium, containing the oxygen, is then removed from the metal powder by evaporation and subsequently by selective chemical leaching or dissolution of the powder.

The following description and accompanying drawings relate primarily to a specific embodiment, such as refractory metals, of the invention, and the invention in its broader aspect should not be so limited to one specific embodiment as herein shown and described, but departures may be made therefrom within the scope of the accompanying claims without departing from the principals of the invention and without sacrificing its chief advantages.

The alloys of tantalum or niobium of the present invention include alloys of tantalum and/or niobium, either or both with other metals, and further includes incorporation of an oxide, which has a higher free energy of formation than Ta and/or Nb oxide, such as for example yttrium oxide, thorium oxide, or aluminum oxide. The oxide is blended into the tantalum and/or niobium powder having oxygen content of less than about 300 PPM. The alloys of the present invention also include alloys of tantalum and/or niobium and a further alloying element with a low oxygen content blended into the tantalum or niobium powder, provided that the oxygen content of the blend is less than about 300 PPM. The alloys of the present invention further include alloys of tantalum and/or niobium hydride and a further alloying element wherein the alloying element and the tantalum and/or niobium hydride powder are blended prior to deoxidation to form the alloy having the low oxygen content. The alloys of the present invention still further include alloys of tantalum and/or niobium and a further alloying element wherein the oxygen addition associated with the alloying element does not raise the oxygen content of the alloy above 300 PPM.

As described above, in the process for producing formed powder metal products of tantalum, niobium and their alloys, the metal hydride powder is deoxidized to an oxygen content of less than about 300 PPM. The powder is consolidated to form a tantalum, niobium or alloy product, having an oxygen content below about 300 PPM or 200 PPM or below 100 PPM, but for many powder metallurgy purposes between about 100 PPM and 150 PPM.

According to the present invention, a formed tantalum niobium or alloy product, having the low oxygen content, may be produced from metal hydride powder by any known powder metallurgy techniques. Exemplary of these powder metallurgy techniques used for forming the products are the following, in which the steps are listed in order of performance. Any of the following single techniques or sequences of techniques may be utilized in the present invention:

cold isostatic pressing, sintering, encapsulating, hot isostatic pressing and thermomechanical processing;

cold isostatic pressing, sintering, hot isostatic pressing and thermomechanical processing;

cold isostatic pressing, encapsulating, hot isostatic pressing and thermomechanical processing;

cold isostatic pressing, encapsulating and hot isostatic pressing;

encapsulating and hot isostatic pressing;

cold isostatic pressing, sintering, encapsulating, extruding and thermomechanical processing;

cold isostatic pressing, sintering, extruding, and thermomechanical processing;

cold isostatic pressing, sintering, and extruding;

cold isostatic pressing, encapsulating, extruding and thermomechanical processing;

cold isostatic pressing, encapsulating and extruding;

encapsulating and extruding;

mechanical pressing, sintering and extruding;

cold isostatic pressing, sintering, encapsulating, forging and thermomechanical processing;

cold isostatic pressing, encapsulating, forging and thermomechanical processing;

cold isostatic pressing, encapsulating and forging;

cold isostatic pressing, sintering, and forging;

cold isostatic pressing, sintering and rolling;

encapsulating and forging;

encapsulating and rolling.

cold isostatic pressing, sintering and thermomechanical processing;

spray depositing;

mechanical pressing and sintering;

mechanical pressing, sintering, repressing and resintering;

plasma assisted hot pressing;

plasma assisted hot pressing and extruding;

plasma assisted hot pressing and thermomechanical processing;

plasma assisted hot pressing, extruding and thermomechanical processing.

Other combinations of consolidating, heating and deforming may also be utilized.

The effectiveness and advantages of the products and processes of the present invention will be further illustrated by the following non-limiting examples.

EXAMPLE 1

This example illustrates production of a tantalum powder with less than 300 PPM oxygen by deoxidation of tantalum hydride under a partial pressure of argon. Tantalum hydride powder, made by a conventional method as described above, was blended with 0.3 wt.-% Mg powder and placed in a vacuum furnace retort, which was evacuated, and backfilled with argon. The pressure in the furnace was set at 100 microns with argon flowing and the vacuum pump running. The furnace temperature was ramped to 650° C. in 50° C. increments, held until temperature equalized, then ramped up to 950° C. in 50° C. increments. When the temperature equalized at 950° C. it was held for two hours. After two hours at 950° C. the furnace was shut down and cooled to room temperature. Once the furnace cooled its powder content was removed from the retort. The magnesium, containing the oxygen, was then removed from the metal powder by acid leaching.

Properties of the resultant Ta powder were as follows:

Particle Size: −100 mesh (less than 150 microns)

Oxygen: 240 PPM

Surface Area: 462 $cm^2/gm$

Specific Oxygen: 0.52 microgram/$cm^2$

EXAMPLE 2

This example illustrates reduction of a tantalum powder with less than 200 PPM oxygen by the deoxidation of tantalum hydride under a partial pressure of argon. Tantalum hydride powder, made by conventional method, was blended with 0.3 wt.-% Mg and placed in a vacuum furnace, retort, which was evacuated, and backfilled with argon. The pressure in the furnace was set at 100 microns with argon flowing and the vacuum pump running. The furnace temperature was ramped to 850° C. in 50° C. increments, held until temperature equalized, then held for 3 hours. It was then ramped up to 950° C. in 50° C. increments. When the temperature equalized at 950° C. it was held for two hours. After two hours at 950° C. the furnace was shut down and cooled to room temperature. Once the furnace cooled its powder content was removed from the retort. The magnesium, containing the oxygen, was then removed from the metal powder by acid leaching.

Properties of the resultant tantalum powder were as follows:

Particle Size: −100 Mesh (less than 150 micrometers)

Oxygen: 199 PPM

Surface Area: 465 cm2/gram

Specific Oxygen: 0.43 microgram/cm$^2$

EXAMPLE 3

Tantalum powder with less than 100 PPM oxygen was produced by the deoxidation of tantalum hydride under a positive pressure of argon. Tantalum hydride powder, made by conventional method, was blended with 0.3 wt.-% Mg and placed in a production vacuum furnace retort, which was evacuated, and backfilled with Argon. The pressure in the furnace was set at 860 Torr with argon flowing. The furnace temperature was ramped to 650° C. in 50° C. increments, held until temperature equalized, then held for 4 hours. It was then ramped up to 1000° C. in 50° C. increments. When the temperature equalized at 1000° C. it was held for six hours. After six hours at 1000° C. the furnace was shut down and cooled to room temperature. Once the furnace cooled its powder content was removed from the retort. The magnesium, containing the oxygen, was then removed from the metal powder by acid leaching.

Properties of the resultant Ta powder were as follows:

Particle Size: −100 Mesh (less than 150 microns)

Oxygen: 77 PPM

Surface Area: 255 cm2/gm

Specific Oxygen: 0.30 microgram/cm$^2$

EXAMPLE 4

The following tests were conducted to show that the tantalum, niobium or alloy powder, of the present invention, is compressible, and to show the strength of the powder of the present invention. Tantalum powder having an oxygen content of less than 300 PPM, prepared by a procedure similar to the procedure of Example 1, was utilized as the starting powder. The starting powder was placed in a die and pressed at various pressures, into tablets. The density of the tablets as a function of the pressing pressures were as follows:

| Pressure (lbs./sq. in.) | Density (% of Theoretical) |
|---|---|
| 40,000 | 82 |
| 60,000 | 88 |
| 80,000 | 92 |
| 90,000 | 93 |

These results show that the powders of the present invention are compressible.

To show the strength of the powder of the present invention after mechanical pressing tantalum powder having an oxygen content of less than 300 PPM, prepared by a procedure similar to the procedure of Example 1, was placed in a die and pressed, at various pressures, into bars about ½ inch by about ½ inch, by about 2 inches. The transverse rupture strength of these bars was as follows:

| Pressure (lbs./sq. in.) | Transverse Rupture Strength (lbs./sq. in.) |
|---|---|
| 40,000 | 2680 |
| 60,000 | 5385 |
| 80,000 | 6400 |
| 90,000 | 8360 |

Generally a minimum strength of about 2000 lbs./sq. in. is desired for normal handling of pressed compacts. The data from the compressibility test together with the rupture strength test indicates that this strength level can be obtained with the powder of the present invention formed at a pressure of about 40,000 PSI.

Other Embodiments

In addition to the embodiments indicated above, the following further embodiments can be made.

Figure 1B:
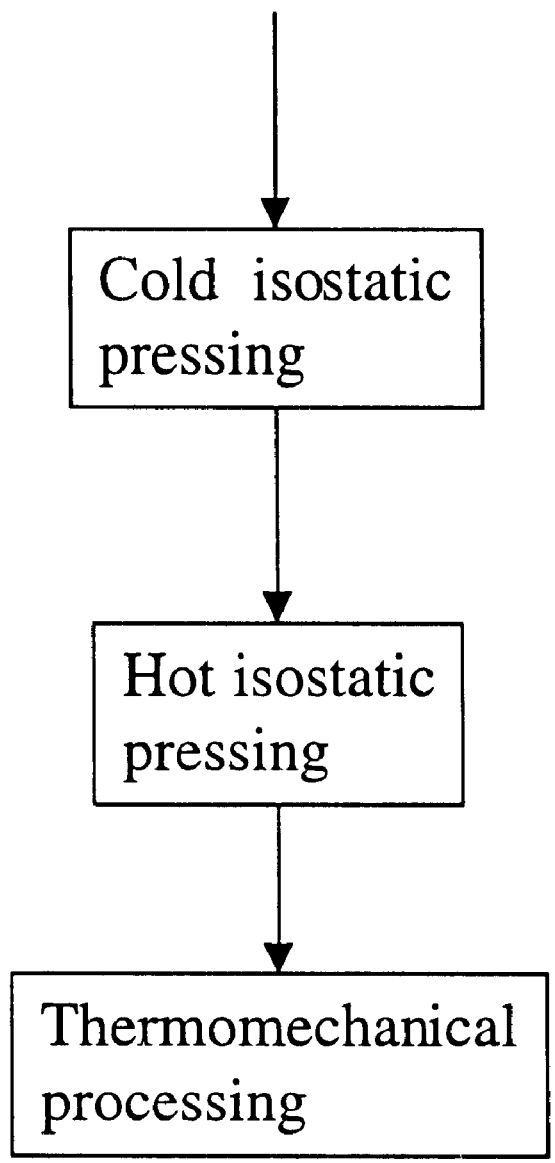
FIGS. 1b–1e are flow charts showing examples of forming steps to create products made of low oxygen powder.

The production of a formed tantalum product having an oxygen content of less than 300 PPM can be achieved by cold isostatic pressing of various kinds of known Ta/Nb powders to form a compact, followed by a hot isostatic pressing (HIP) step to densify the compact and then thermomechanical processing of the powder compact for further densification and completion of the bonding, as illustrated in FIG. 1b. Preferably, tantalum powder having an oxygen content of less than 300 PPM, prepared by a procedure similar to the procedure of Example 1, would be utilized as the starting powder. This powder would be cold isostatically pressed at 60,000 pounds/sq. in. and room temperature, into a compact with rectangular cross-section, then hermetically encapsulated and hot isostatically pressed (HIPed) at 40,000 lbs./sq. in. and 1300 degrees C. for 4 hours. The HIPed compact would be unencapsulated and converted to sheet or foil by thermomechanical processing steps.

Figure 1C:
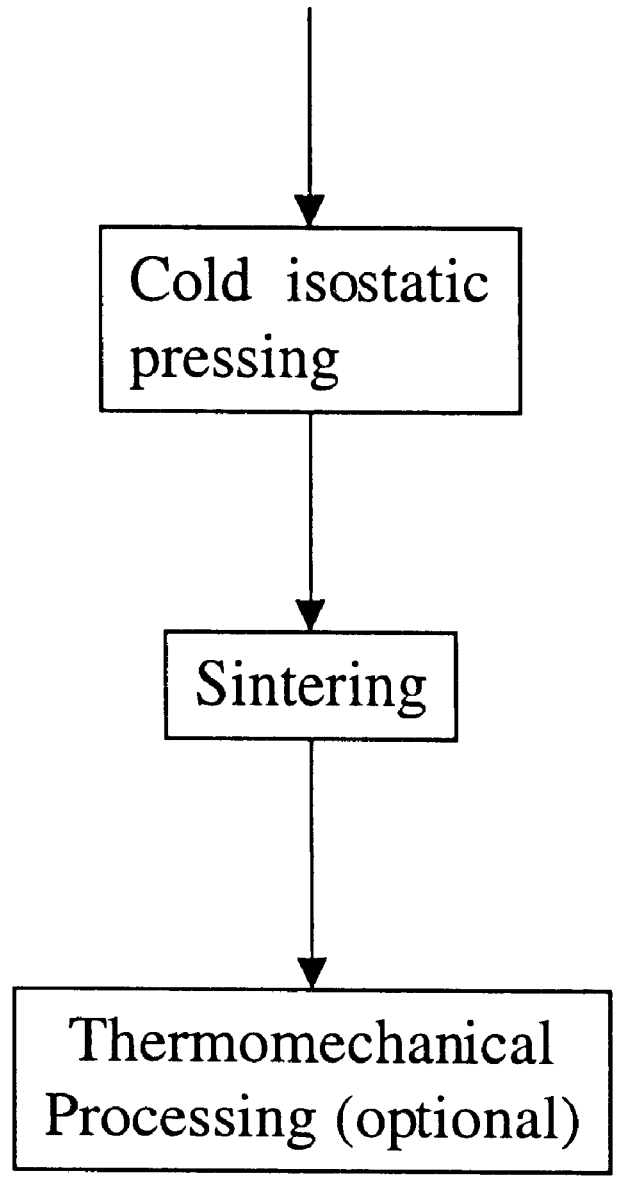

A similar process, as illustrated in FIG. 1c, of just cold isostatic pressing, sintering and thermomechanical processing using tantalum powder having an oxygen content of less than 300 PPM, prepared by a procedure similar to the procedure of Example 1, can be conducted by cold isostatically pressing at 60,000 lbs./sq. in. into a bar shape preform. This preform would be sintered at 1500 degrees C. for 2 hours in a vacuum of less than about 0.001 Torr to yield a preform having a density of about 95% theoretical density (Th) and less 300 PPM oxygen. The sintered preform would be converted into sheet and foil by thermomechanical processing steps.

Figure 1D:
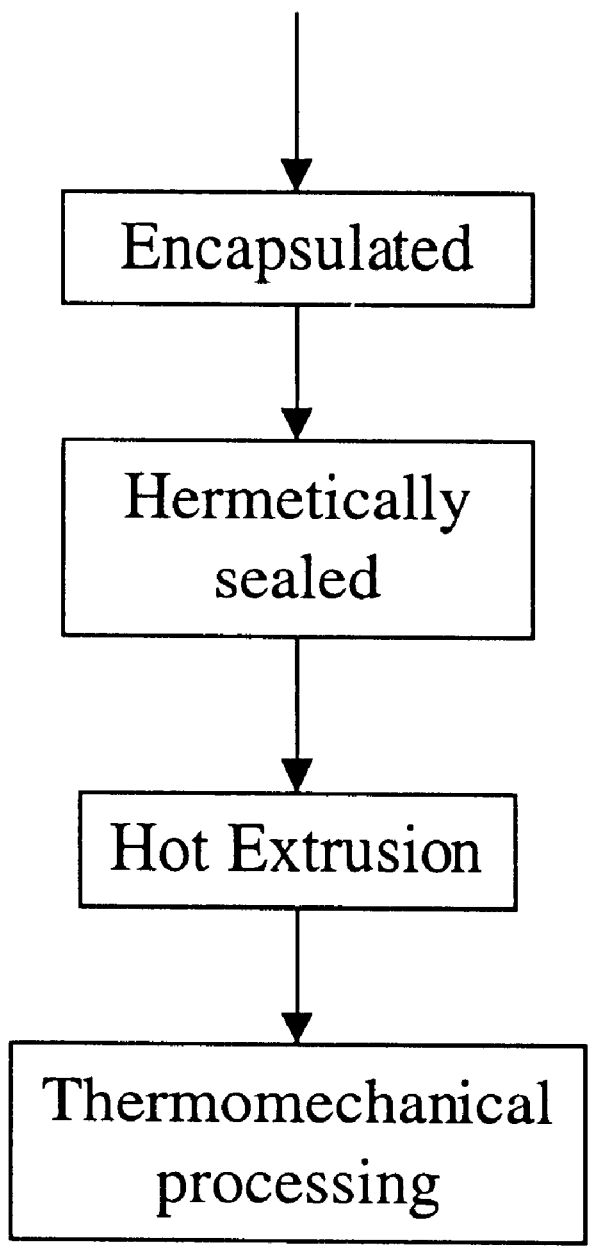

Formed tantalum bar and wire having an oxygen content of less than 300 PPM can be made by hot extrusion and thermomechanical processing using tantalum powder having an oxygen content of less than 300 PPM, prepared by a procedure similar to that of Example 1, as the starting powder, and illustrated in FIG. 1d. This powder would be hermetically encapsulated and then extruded through a circular die at 1000° C. The extruded product would have oxygen content of less than 300 PPM. The extruded preform was converted into rod and wire by the thermomechanical processing steps.

Figure 1E:
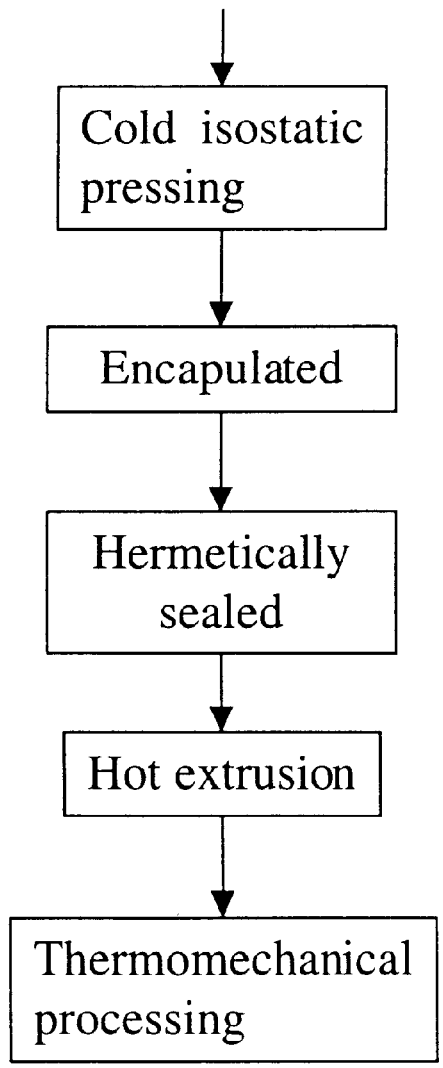

Another such process sequence, illustrated in FIG. 1e, is cold isostatic pressing, hot extrusion and thermomechanical processing utilizing tantalum powder having an oxygen content of less than 300 PPM, prepared by a procedure similar to that of Example 1, as the starting powder. This powder would be cold isostatically pressed, hermetically encapsulated then extruded at 1000 ° C. The extruded product would have oxygen content of about 300 PPM. It would be converted into rod and wire by the thermomechanical processing steps.

Production of a formed tantalum sheet or foil having an oxygen content of less than 300 PPM by hot extrusion and thermomechanical processing can be made, using tantalum powder having an oxygen content of less than 300 PPM, prepared by a procedure similar to the procedure of Example 1, as the starting powder. This powder can be hermetically encapsulated then extruded through a rectangular die at 1000° C. to produce an extruded product having oxygen content of less than 300 PPM. The extruded product can be converted sheet or foil by the thermomechanical processing.

Tantalum sheet or foil with oxygen content of less than 300 PPM can be produced using the Example 1 powder by cold isostatic pressing, hot extrusion and thermomechanical processing. This compact made by cold isostatically pressing could be hermetically encapsulated then extruded at 1000° C. to produce an extruded product with an oxygen content of about 300 PPM which can be converted into sheet and foil by thermomechanical processing steps.

A formed product of tantalum, produced by mechanical pressing and sintering. Tantalum powder having an oxygen content of less than 300 PPM, prepared by a procedure similar to the procedure of Example 1, would be utilized as the starting powder. This tantalum powder was placed in a die and pressed, using uniaxial pressure, into a tablet with a pressed density of about 80% of the theoretical density. This tablet was then sintered at 1500° C. for 2 hours in a vacuum evacuated to less than about 0.001 Torr. The final sintered tablet has oxygen content of less than 300 PPM.

Tantalum products having oxygen content of less than 300 PPM can be prepared by mechanical pressing, sintering, repressing and resintering. Tantalum powder having an oxygen content of less than 300 PPM, prepared by a procedure similar to the procedure of Example 1, can be utilized as the starting powder. It is placed in a die and mechanically pressed, using uniaxial pressure. The pressed tablet should be then sintered at 1500° C. for 2 hours in a vacuum evacuated to less than about 0.001 Torr. The sintered tablet would then be repressed and resintered at 1500 degree C. for 2 hours in a vacuum evacuated to less than about 0.001 Torr. The resintered tablet will have oxygen content of less than 300 PPM and be suitable for thermomechanical processing to produce a formed tantalum product Tantalum product having oxygen content of less than 300 PPM can be prepared by spray deposition, using starting powder having an oxygen content of less than 300 PPM, prepared by a procedure similar to the procedure of Example 1. The powder can be spray deposited up to a thickness of 0.1 inch on an alloy substrate formed from stainless steel. Particle size, flow properties and oxygen content of the powder will be suitable for consolidation by spray deposition.

Plasma activated sintering can be used for production of a formed tantalum product having oxygen content of less than 300 PPM. Tantalum powder having an oxygen content of less than 300 PPM, prepared by a procedure similar to the procedure of Example 1, would be utilized as the starting powder. It would be poured into a tantalum foil lined graphite die and graphite punches inserted into the die from both ends. The die punch assembly is placed on a water-cooled steel block. Another water-cooled steel block is brought in contact with the top punch. The water-cooled steel block is attached to a hydraulic piston on the top and the base on the bottom to dissipate the heat accumulated during the consolidation. The top and bottom water-cooled steel blocks are also attached to the positive and the negative ends of a DC power supply.

The powder filled die punch assembly is provided in a chamber. The chamber should be evacuated to 500 milliTorr. The consolidation would be carried out in two stages. In the first stage, the intent is primarily to purify the powder via plasma sputtering of particle surfaces. A pressure of about 4300-psi would be applied on the powder through the punches and a pulsed DC current of 1000 A would be passed through the powder. These conditions would be maintained for two minutes.

During the second stage the pressure would be raised to about 6500 psi and non-pulsed DC current of 4500 A passed through the powder. These conditions would be maintained for two minutes. At the end of the cycle, the power to the punches is turned off, the vacuum pump is turned off and the evacuation chamber backfilled with nitrogen. The die punch assembly is allowed to cool to the room temperature and the consolidated tantalum sample is removed from the die. The consolidation cycle would be about eight minutes. The sintered preform will have a density of over 95% of the theoretical density and oxygen content of less than 300 PPM.

A niobium powder with less than 300 PPM oxygen can be produced by the deoxidation of niobium hydride under partial pressure of argon. Niobium hydride powder would be blended with 0.3 wt.-% Mg and placed in a vacuum furnace retort, which is evacuated, and backfilled with argon. The pressure in the furnace would be set at 100 microns with Argon flowing and the vacuum pump running. The furnace temperature would be ramped to 650° C. in 50° C. increments, held until temperature equalized, then ramped up to 950° C. in 50° C. increments. When the temperature equalized at 950° C. it would be held for two hours. After two hours at 950° C. the furnace is shut down. Once the furnace cools its powder content is removed from the retort. The magnesium, containing the oxygen, would then be removed from the metal powder by acid leaching to produce the resulting niobium powder having an oxygen content of less than 300 PPM.

Figure 2:
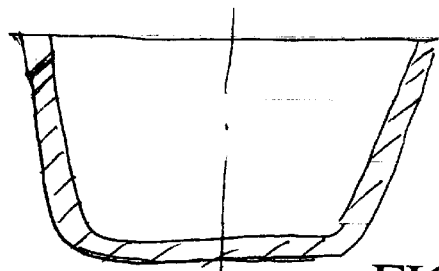
FIGS. 2–4 are cross section views of seamless pots produced according to practice of the invention in a first preferred embodiment thereof utilizing forming techniques such as spinning.
Figure 3:
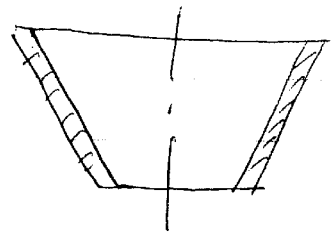
Figure 4:
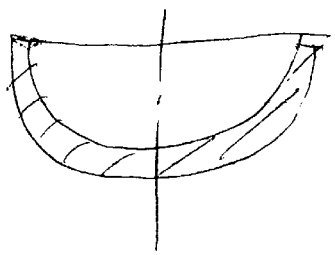

A seamless pot is made by providing a plate form (e.g. rectangle or round disc or other form) of a refractory metal and spinning to the desired pot form. Spinning 'bends' a plate into a cup by pressing on one side of the metal. Flow forming elongates the wall of the cup by squeezing it between an interior form and an exterior wheel. The original planar form can be provided by arc or electron beam or plasma melting or powder metallurgy, and cold or hot reduction to sheet form by extrusion, forging and/or rolling. The spinning process and equipment are per se well known and as a practical matter dependent on a sufficiently thin section of the planar refractory metal for effective conduction. In turn thinner sections of the refractory metal are enabled under the present invention because in service use the metal won't be exposed to selective erosion (e.g., as in the preferential sputtering of weld joints). Sample forms of the spun metal sheet are shown as finished pots in FIGS. 2–4.

Figure 5:
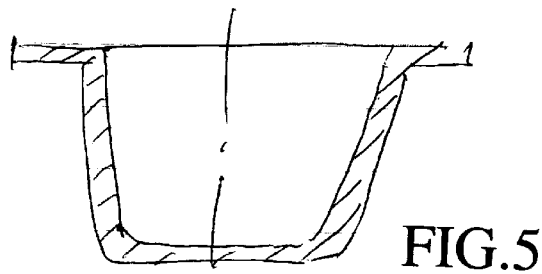
FIGS. 5–7 are cross section views of seamless pots produced according to practice of the invention in a second preferred embodiment thereof using powder metallurgy (PM) to enable establishment of flanges or like extensions of the pots.
Figure 6:
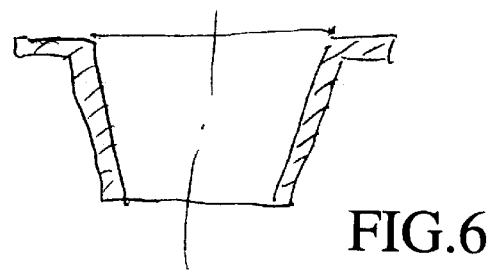
Figure 7:
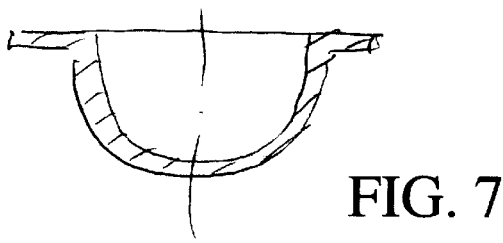

Under a second embodiment of the invention powder of the refractory metal is cold pressed to the thin section pot shape and then consolidated by sintering or hot isostatic pressing (HIPing). This can also incorporate an extra element of a very sharp bend such as a flange around the pot edge that would be unduly difficult to establish for the refractory metal by spinning. Sample forms of the finished pots with flanges as producible by cold pressing and HIPing are shown in FIGS. 5–7.

Figure 8:
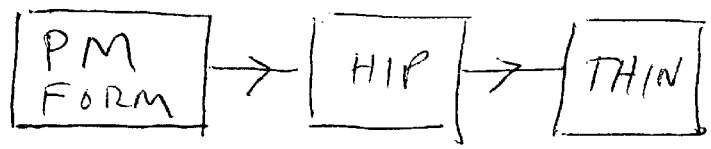
FIG. 8 is a flow chart showing practice of the invention according to a preferred embodiment thereof with a combination of PM and forming.

A third embodiment is illustrated by the flow chart of FIG. 8. Sheets are formed by the powder metallurgy (PM) method described above and HIPed but with a deliberate thicker section than desired for end use as a whole or in parts. The sheet is then subjected to a flow forming process of local rolling, swaging, upset forging or the like to thin it out and eliminate nonuniformities of thickness and in the course of doing so completing consolidation of the curved part, which can have any of the shapes of FIGS. 2–7 or other nonplanar forms.

A still further embodiment of the invention is the production of pots from a billet of the refractory metal by back extrusion.

Some details of implementation follow:

To implement the PM approach, a refractory metal or alloy powder of −100 mesh may be cold pressed into near-net shape of a sputter target at 60 KSI. It may be encapsulated in a steel can and hermetically sealed in vacuum. The sealed assembly may be hot isostatically pressed at 500 KSI/1200° C. for four hours. The steel may be removed by pickling in acid. The near-net shape may be machined into a ready-to-use component.

Figure 9:
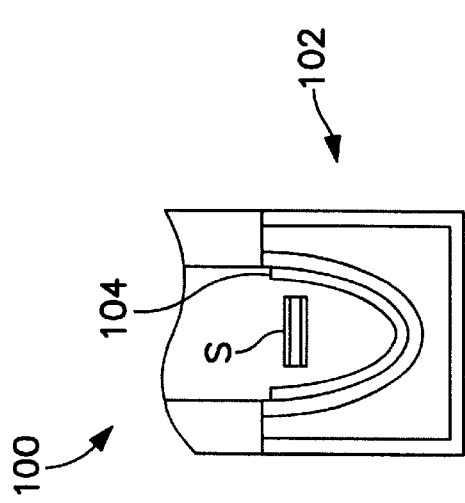

In one application, the machined part may be used in a hollow cathode magnetron sputtering apparatus as shown in FIG. 9; its performance will be superior to that of a welded target as measured by the uniformity of the deposited film and the formation of nodules on the surface of the target.

A refractory or alloy powder of −100 mesh may be cold pressed into a disk of 6.5" diameter and 2" height at 60 KSI. It may be encapsulated in a steel can and hermetically sealed in vacuum. The sealed assembly may be hot isostatically pressed at 50 KSI/1200° C. for four hours. The steel can be removed by pickling in acid. The disk may be converted into a pot by one of (a) back extrusion, (b) spin forming, (c) flow forming, or (d) a combination of such processes. The pot may be annealed at 1300° C. for 90 minutes in a vacuum environment.

A refractory metal or alloy powder of −100 mesh and having a suitable chemistry, including metallic and interstitial impurities, may be cold pressed into a disk of 6.5" diameter and 2" height at 60 KSI. It may be sintered at 1500° C. for four hours in a vacuum environment. The disk may be converted into a pot, as in (2) above and annealed and used.

Tantalum powder of −100 mesh and having a suitable chemistry for sputter target usage, including metallic and interstitial impurities, was encapsulated in a 7" diameter copper can and hermetically sealed in vacuum. It was extruded at 1050° C. through a 2"×1" rectangular die. The can was removed by pickling. The extruded bar was annealed at 1370° C. and processed into 0.2" thick plate by rolling. The rolled plate was annealed at 1370° C. The performance of the annealed plate was utilized and characterized in magnetron sputtering with acceptable results.

(5) A tantalum metal ingot, having a suitable chemistry for sputtering target usage, including metallic and interstitial impurities, was forget to the shape of a sheet-bar and annealed at 1370° C. It was rolled to 0.55" thickness, annealed, and cut to the shape of a disc. The disc was spun to the shape of a cup, 5" high and 10" diameter, which was annealed again. The cup was flow-formed to thin the sidewalls and increase the height to 10", then annealed again, at 1065° C. The final grain size, at the top of the sidewalls, was ASTM 5 to ASTM 6.

(6) A refractory or alloy powder of −100 mesh may be encapsulated in a copper can 7" diameter or larger and hermetically sealed in vacuum. It may be extruded at 1050° C. through a rectangular die 5"×2". The can may be removed by pickling. The extruded bar may be annealed at 1370° C. and processed into 0.55" thick plate by rolling, annealed again, and cut to the shape of a disc. The disc may be spun to the shape of a cup, 5" high and 10" diameter, which will be annealed again. The cup may be flow-formed to thin the side-walls and increase the height to 1–", then annealed again at 1065° C.

Figure 10:
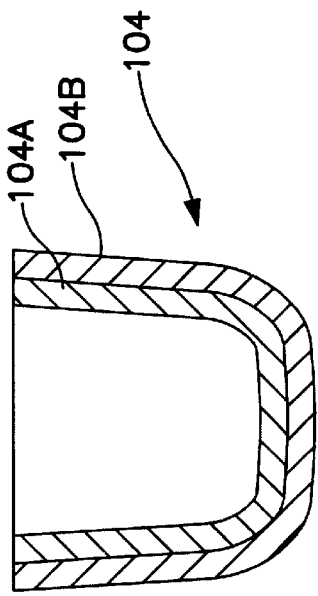
FIGS. 9–10 are sketches illustrating an emplaced seamless pot sputtering target in a magnetron sputtering apparatus.

FIGS. 9–10 show (in part) a magnetron sputtering apparatus 100 with a cathode assembly 102 as a water cooled block with a large reservoir as shown or bonded on coolant pipes having an curved cathode face portion 104 made of an assembly of a seamless refractory metal pot 104A, made as described above in various embodiments, and a backing plate 104B of steel, copper, aluminum or other metal secured to the refractory metal pot by epoxy or weld bonding and/or back coating. A typical sputter environment is a back fill of argon at 10–2 mm Hg pressure. A substrate is indicated at S (and there can be many such substrates on fixed or movable jigs). The plasma established standard means (not shown).

Figure 11A:
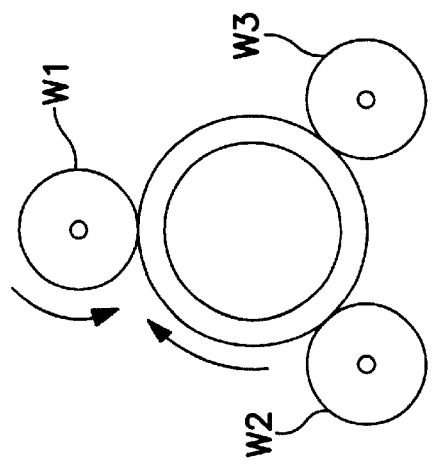
FIGS. 11–11A illustrate one of the forming processes described herein.
Figure 11:
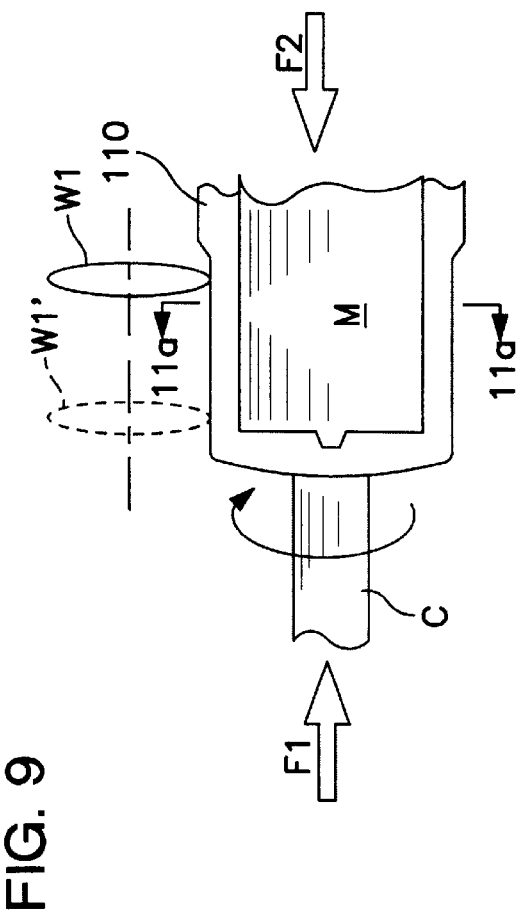

FIGS. 11–11A illustrate flow-forming wherein a cup 110 made, e.g., by PM to near-net shape say, 0.5" thickness can be flow-formed by forming sheets W1, W2, W3 to a lesser thickness while the cup is mounted on a mandrel on a clamped by a clamp block C, the whole assembly rotating. As the thickness is reduced the wheels are displaced axially along the cup. As thickness of the up wall is reduced its length increases correspondingly.

It will be understood that the nonplanar sputter targets of the present invention through their freedom from weld joints and controlled uniformity can afford longer life and avoidance of expensive over-design, yet provide significant assurance against breakthroughs of coolant or exposure of backing plate to the sputter environment.

The improved sputtering target of the present invention is produced using a tantalum powder containing less than 150 PPM oxygen and less than 100 PPM of metallic impurities. Powders made from tantalum alloys (including but not limited to the alloys TaNb, TaMo, TaW, TaSi, TaAl) may also be used. The powders are pressed into a disk and the disk encapsulated in a metallic container such as copper or steel. Consolidation of the tantalum powder may be done by sintering, resistance sintering, hot isostatic pressing (HIPing), extrusion or other techniques. In all cases, it may be beneficial to apply subsequent thermo-mechanical processing (TMP) after consolidation, since the processing will close some porosity and/or might improve grain size or texture. Deformation steps may include forging, orbital forging or rolling.

In one embodiment, a copper container is evacuated, filled with tantalum powder, hermetically sealed, and extruded through a die to give a 10:1 extrusion ratio. The copper container is removed by acid treatment and the extruded bar is thermomechanically processed into a sheet form flat or curved tantalum sputtering target. In another embodiment, a steel container is evacuated, filled with the tantalum powder, hermetically sealed and HIPed. The steel container is removed by machining and the HIPed piece is thermomechanically processed into a sheet form flat or curved tantalum sputtering target.

Anneals may be used to improve workability of the material in between two deformation steps or to adjust grain size and texture through recrystallization although a final anneal may not be necessary. When the powder is canned during the consolidation (usually to protect it from the environment at high temperature), the can will bond to the tantalum. In manufacturing the sputtering target, the bonded sheath of the formed composite billet may be used as backing plate and thereby eliminate the bonding procedure.

The P/M target of the present invention inherently yields a superior uniformity of properties, including grain size and texture, as compared to the I/M target and therefore yields a better uniformity of the sputtered film. Using the can material as a backing plate for the target eliminates one processing step in the manufacture of sputtering targets and contributes to a more economical process.

Figure 12:
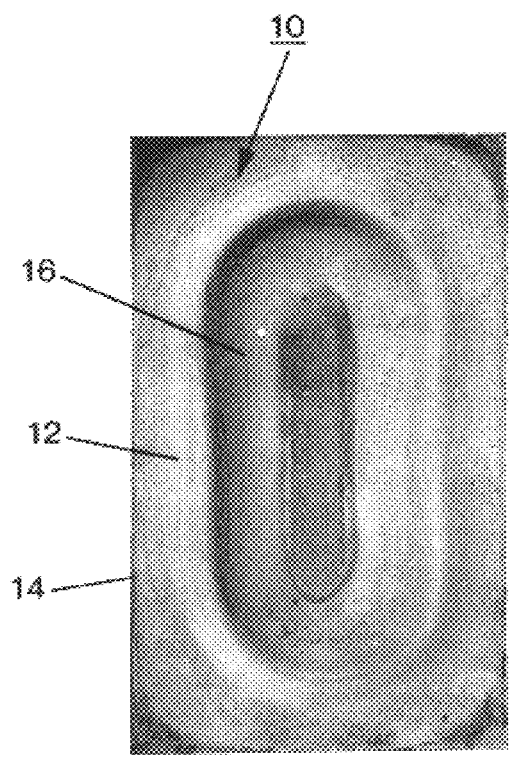
FIG. 12 shows a typical I/M sputtering target after sputtering.
Figure 13:
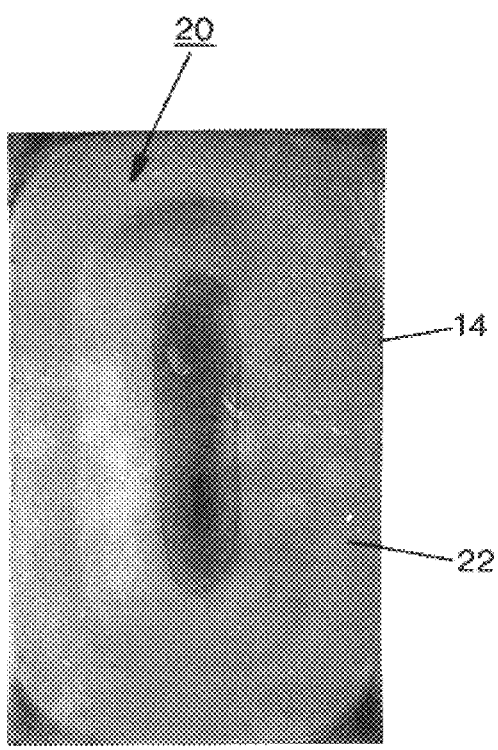
FIG. 13 shows a P/M sputtering target of the present invention after sputtering.

Referring to FIGS. 12 and 13, 5"×8" sputtering targets were made according to traditional I/M processes and according to the PAM process of the present invention, respectively. The I/M sputtering target 10 consists of a thin sheet of tantalum 12, bonded to a backing plate 14. FIG. 12 illustrates how the I/M sputtering target 10 erodes non-uniformly after sputtering. Non-uniform grain size and/or texture cause the line-like patterns 16 in the trench of the I/M target 10. The P/M sputtering target 20 consists of a thin sheet of tantalum 22 bonded to a backing plate 14. FIG. 13 illustrates how the P/M sputtering target 20 of the present invention erodes uniformly after sputtering. The matte appearance of the PIM target's surface is caused by uniform sputtering efficiency throughout the target.

In another embodiment, the process provides P/M sheets of large size (>50 pounds) having good mechanical properties and small grain size, capable of a higher yield than conventional P/M processes for sheet manufacture, typically 20 pounds. Low oxygen Ta or Nb powder of less than 200 PPM, preferably less than 150 PPM, of non-spherical particles and sizing less than __microns (FAPD), is provided per processes described herein. Powders with a higher content in oxygen cannot be consolidated to full density and/or will not yield good mechanical properties. The powder is consolidated either by HIPing (hot isostatic pressing) or by extrusion. Preferably, the powder is compacted into a coherent precursor form of at least 100 pounds with a density of 80–90% theoretical. The precursor density is brought to 95–100% theoretical. Both methods of consolidation are capable of providing suitable P/M sheet bars with a weight of up to several hundred pounds. Thermomechancial processing of the P/M sheet bar is similar to standard processes.

Comparative Example I (a Two Step Process)

The following comparative examples illustrate the benefits of the present invention.

This example illustrates the prior art. Tantalum hydride powder made by conventional methods was dehydrided at 650° C. for ten hours then cooled and removed from the retort. It was then blended with 0.5-wt % Mg and placed in a vacuum furnace retort, which was evacuated, and backfilled with argon. The pressure in the furnace was set at 860 Torr with argon flowing. The furnace temperature was tamped to 1000° C. When the temperature equalized at 1000° C. it was held for six hours. After six hours at 1000° C. the furnace was shut down and cooled to room temperature. Once the furnace cooled, its powder content was removed from the retort. The magnesium-containing oxygen was then removed from the metal powder by acid leaching.

Properties of the resultant Ta powder were as follows:

Particle size: –100 mesh (less than 150 microns)

Oxygen: 145 PPM

Surface area: 250 $cm^2$/gm

Specific oxygen: 0.58 microgram/$cm^2$

A comparison of this example with Example 3 above illustrates that the deoxidation of tantalum hydride results in significantly lower levels of oxygen in tantalum powder.

Comparative Example II

Tantalum hydride powder made by conventional methods was dehydrided at 650° C. for ten hours then cooled and removed from the retort. It was then blended with 0.5 wt-% Mg (present invention) and placed in a vacuum furnace retort, which was evacuated and backfilled with argon. The pressure in the furnace was set at 100 microns with argon flowing and the vacuum pump running. The furnace temperature was ramped to 850° C. in 50° C. increments. When the temperature equalized at 950° C. it was held for two hours. After two hours at 950° C. the furnace was shut down and cooled to room temperature. Once the furnace cooled its powder content was removed from the retort. The magnesium, containing oxygen, was then removed from the metal powder by acid leaching.

Oxygen contents of deoxidized tantalum hydride (Example 2) and tantalum powder are given below for various size fractions obtained from the one step (present invention) and two step (Comparative II) processes.

| Particle size | Oxygen on Deoxidized Tantalum Hydride (in PPM) (one thermal cycle) | Oxygen of Deoxidized Tantalum (in PPM) (two thermal cycles) |
| --- | --- | --- |
| Minus 100 mesh | 199 | 345 |
| 100/140 | 86 | 182 |
| 140/200 | 107 | 207 |
| 200/270 | 146 | 270 |
| 270/35 | 147 | 328 |
| Minus 325 | 367 | 615 |

Numerous variations and modifications may obviously be made without departing from the present invention. Accordingly, it should be clearly understood that the forms of the present invention herein described are illustrative only and are not intended to limit the scope of the invention.

Figure 15:
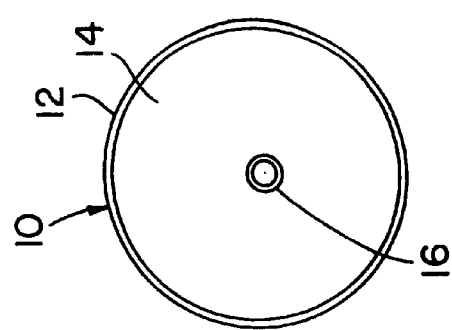
Figure 14:
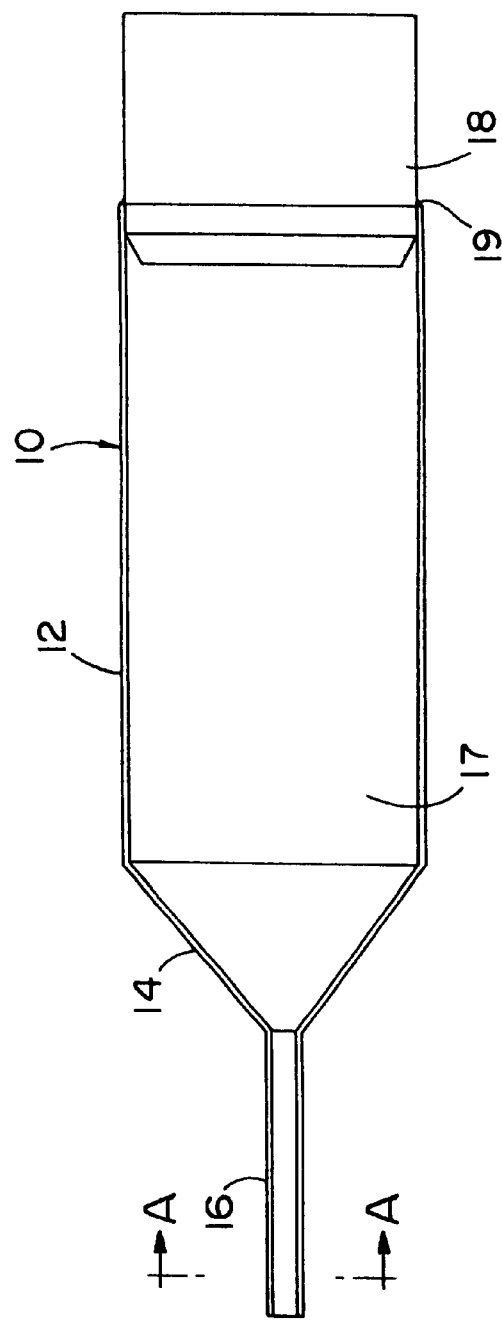
FIG. 14 is a schematic side view and FIG. 15 a front-end view of an extrusion can (viewed as indicated by arrows A—A in FIG. 14) used in implementing a preferred embodiment of the invention.

As shown in FIGS. 14–15, an extrusion can 10 usable in the process of the invention comprises a ten to twenty inch long, 6.25 in. diameter 0.060 in. wall cylinder 12 copper or copper-nickel alloy, a 4–5 inch long (approx.) conical front end 14, and an evacuation tube 16 of 0.040 in. wall copper tubing of about six inches length. A solid copper block 18 is welded into the tube's back end 19. These sizes are scalable up substantially to extrusion billets of several feet long and up to 10–20 in. diameter.

Figure 16:
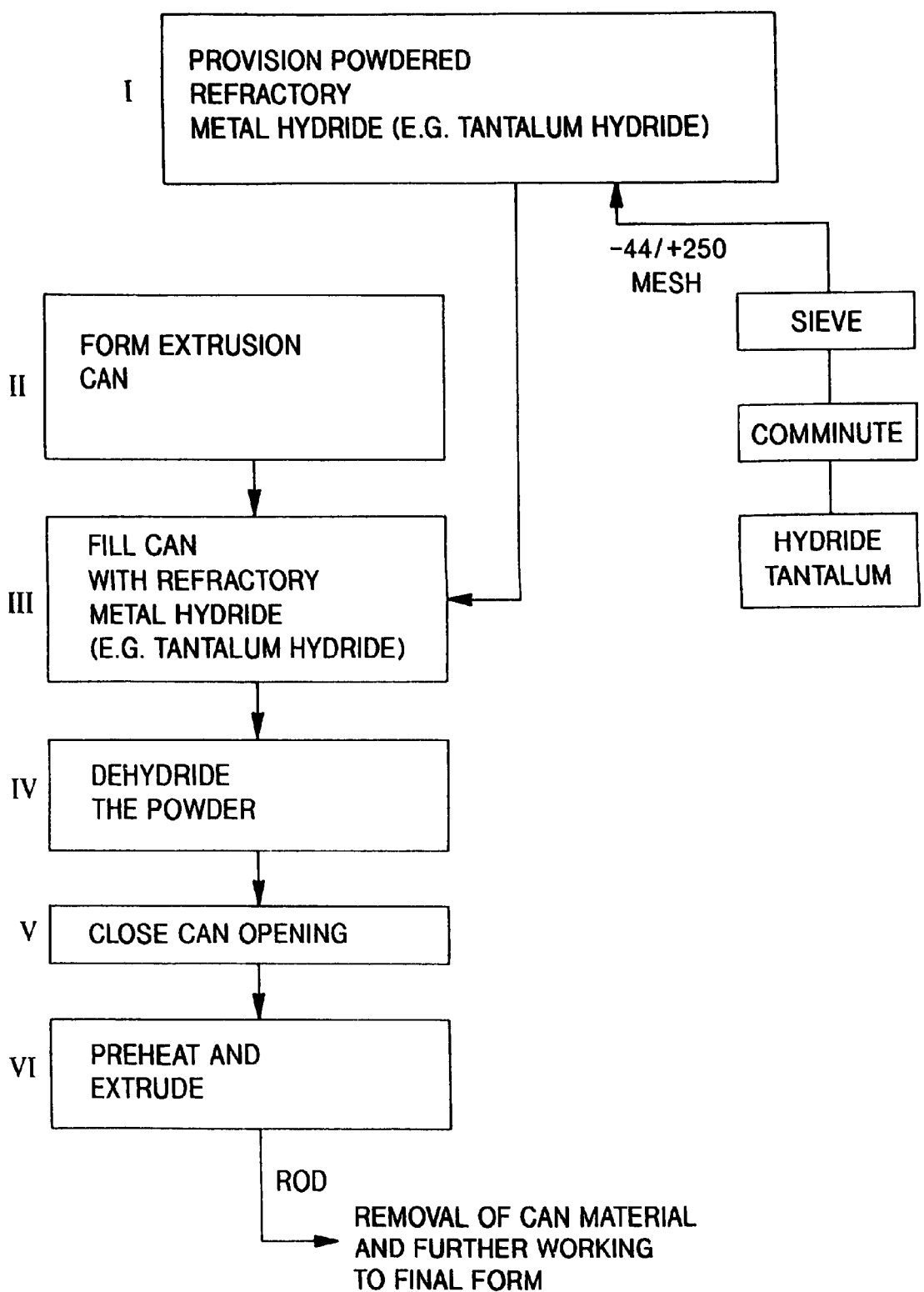
FIG. 16 is a flow chart of the above described process steps, as applied to the case of making tantalum wire.

FIG. 16 shows the process in block diagram form comprising the steps of (I) provision of tantalum hydride powder of 44–250 mesh form or (preferably) minus 120 mesh; (II) forming an extrusion can as shown in FIGS. 12–13 and described above; (III) filling the can with the tantalum hydride powder; (IV) dehydriding the powder; (V) closing "the can opening"; (VI) extruding the filled can.

As mentioned above, loose dehydrided powders are inserted into the interior 17 of the cylinder 12, filling via tube 16. Then the can 10 as a whole is placed in a vacuum furnace to dehydride the powders, in effect pumping via tube 16. The feed end is sealed off and the tube as a whole (billet) can then be extruded.

Hydriding of tantalum powders to embrittle them for use in powder production per se is well known in the capacitor powder arts. See, e.g., U.S. Pat. No. 3,295,951 of Fincham and Villani. It is also well known to add hydrogen to dispersion strengthened metals (e.g. copper, nickel, iron powders strengthened with aluminum oxide inclusions) to reduce any residual oxygen; this is exemplified by teachings of the following U.S. patents of SCM Corporation: U.S. Pat. No. 3,779,714 (Dec. 18, 1973), U.S. Pat. No. 3,884,676 (May 20, 1975), U.S. Pat. No. 3,893,844 (Jul. 18, 1975), U.S. Pat. No. 4,440,572 (Apr. 3, 1984). Following my concept of hydride usage, described above, it was disclosed and claimed by I. Friedman to make tantalum hydride powder, cold isostatic press (CIP) the powder into a billet, dehydride the billet and extrude the billet after wrapping it in a double jacket, with a powder separation between jacket layers. See U.S. Pat. No. 5,445,787 (Aug. 29, 1995) and U.S. Pat. No. 5,482,672 (Jan. 9, 1996).

All the above cited other approaches miss the fundamental point of the present invention—combining a full hydriding of powders to produce a hydrided preform, commuting it to a desired size while excluding oxygen, dehydriding under a condition where adequate elimination of the hydrogen can be obtained without reintroducing oxygen at unacceptable levels (i.e. loose hydride powders in a shell), completion of the billet configuration and extrusion.

The assembled billet is reduced in size and the powders therein are simultaneously consolidated to a coherent workable form in the course of extrusion.

Figure 17:
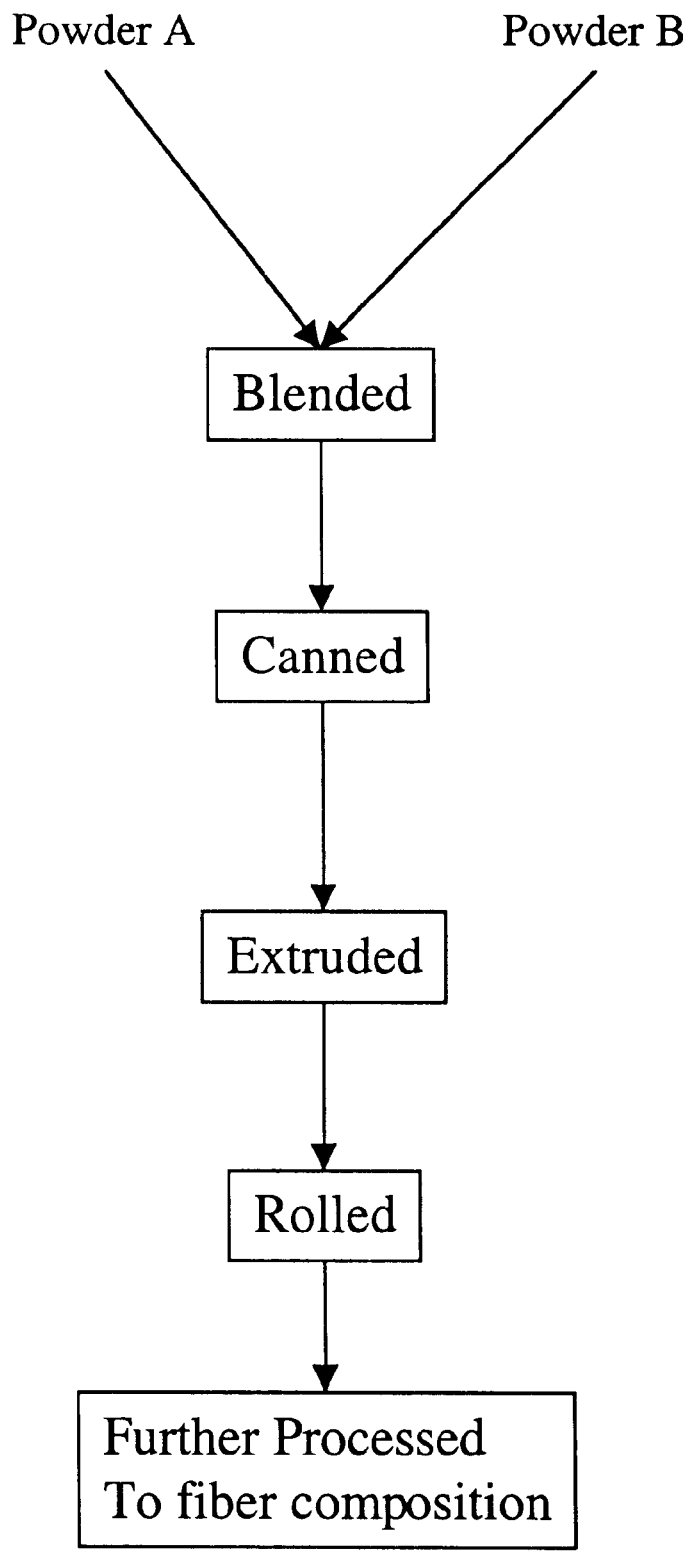
FIG. 17 is a block diagram of the A—B process steps.

An additional embodiment of the invention applies the process to Nb—Cu composites. As illustrated in FIG. 17, Powder A (for example Nb) and B (for example Cu) are blended, canned, extruded, and rolled. Low oxygen copper and niobium powders are used. The physical processes of blending, canning and extruding achieve a uniform distribution of niobium particles of a controlled size in the copper matrix. On subsequent rolling, a uniform distribution of niobium fibers is produced. Low oxygen niobium powder is produced. Magnesium—Ca, or other metals may also be used to achieve reduction of niobium hydride. Judicious heat treatment of copper powder in a hydrogen atmosphere gives less than 300 PPM oxygen without any significant agglomeration of the powder. The low-oxygen blend of Cu—Nb (or Ta, Mo or W) can also be processed into the final products by other methods, normally used for the manufacturing of powder metallurgy mill products, and powder metallurgy parts, including, but not limited to, HIPing, pressing plus sintering.

The blending, canning, extruding, and rolling of low oxygen copper and niobium powders can achieve a uniform distribution of niobium particles of a controlled size in the copper matrix. The low oxygen niobium powder (or other refractory metal powder) can be produced via a magnesium reduction process as described above.

Sieving of the powder is used to control the initial niobium powder size. Annealing the copper powder in a hydrogen atmosphere then cooling in inert gas produces low oxygen copper powder. A trace level addition of a material such as $SiO_2$ helps to prevent agglomeration of the copper powder. These powders are then blended under inert conditions to produce the desired alloy composition. The powders are then sealed in an evacuated can, heated to a desired temperature, and extruded such that the extrusion ratio is at least 8:1. This is done to completely consolidate the copper and niobium powders. On subsequent rolling, a uniform distribution of niobium fibers is produced. The can may be removed either just before or just after the rolling operation. The canning and extrusion can be as described in detail above.

The above process can afford advantages of more uniform nodule distribution in the final material, more uniform material properties, lower manufacturing costs, better control of fiber size, and greater flexibility for alloy modifications and control of properties.

Alternatively, the blended powders may be isostatically pressed into a bar prior to canning and extrusion. The advantage of this method would be to put a higher weight into the compact prior to extrusion to aid in consolidation.

In another embodiment of the invention, blending, canning, extruding, and rolling of low oxygen copper and niobium powders can achieve a uniform distribution of niobium particles of a controlled size in the copper matrix. On subsequent rolling, a uniform distribution of niobium fibers is produced. Low oxygen niobium powder is produced by magnesium (Ca, or other metals may also be used) reduction of niobium hydride.

Judicious heat treatment of copper powder in a hydrogen atmosphere gives less than 300 PPM oxygen without any significant agglomeration of the powder. The low-oxygen blend of Cu—Nb (or Ta, Mo or W) can also be processed into the final products by other methods, normally used for the manufacturing of powder metallurgy mill products, and powder metallurgy parts, including, but not limited to, HIP'ing and pressing plus sintering.

Another use of the invention is to manufacture mill products and parts requiring unique properties (high strength, high electrical conductivity, high thermal conductivity, resistance to softening, resistance to arcing and other examples include annealing bands, welding electrode tips among others.

The hydriding can and the metal hydride are more easily comminuted than the respective metal and this can be used to advantage in another embodiment. The hydride is compacted into the form of thin disks by cold isostatic pressing and the disks are deoxidized by heating in an inert atmosphere (except for presence of a source of a source of vapor of a reduction metal such as Mg or Ca), the combined effect of dehydriding heating and metal vapor reduction lowering the oxygen content of the disks to below a target level, typically under 100 PPM. Residual magnesium oxide is removed by acid leaching. The disks are then stacked in a pre-formed copper extrusion can. In particular areas of practice of the invention, the disks described above can be made with a center hole and as stacked have an elongated hole that is filled, before or after insertion into the extrusion billet, with a rod. The extruded and further worked end product can be used for several purposes. When the disks are Ta or Nb with a Ti rod core, then the resultant extruded and worked (drawn to wire and Cu sheathing removed) can be used as a composite lead wire for, e.g., Ta anodes, of capacitors, the wire comprising a titanium core and Ta or Nb sheath well bonded to each other with a reduced cost basis because of the lower cost of titanium relative to tantalum, but substantially as functional mechanically and electronically as if wholly tantalum.

In a further embodiment the powder can be deoxidized/dehydrided and the low oxygen powder that is produced can be made into disks for stacking and extruding (with or without a rod core inserted).

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A method of making sheet bar and other precursors of formed products to be made by extensive working comprising the steps:

providing a metal as a powder under 300 PPM oxygen content of non-spherical particles, wherein the metal is selected from the group consisting of hafnium, molybdenum, niobium, rhenium, tantalum, tungsten, vanadium, zirconium and alloys of said metals with each other and/or other metals, compacting the powder into a coherent precursor form of at least 40 pounds, and fabricating the precursor to a finished product form.

2. The method in accordance with claim 1, wherein multiple species of metals are provided in powder form as a mixture, wherein the multiple species include at least one higher melting metal and one lower melting metal to produce an alloy or micro-composite of the metals as worked, and the higher melting metal is selected from the group consisting of hafnium, molybdenum, niobium, rhenium, tantalum, tungsten, vanadium, zirconium and alloys of said metals with each other and/or other metals.

3. The method in accordance with either claim 1 or 2, compacting the powder into the coherent precursor form of at least 100 pounds.

4. The method in accordance with either claim 1 or 2, providing the powder under 200 PPM oxygen content.

5. The method in accordance with either claim 1 or 2, providing the powder under 100 PPM oxygen content.

6. The method in accordance with either claim 1 or 2, wherein the finished product is a sheet.

7. The method in accordance with either claim 1 or 2, wherein the finished product is a foil.

8. The method in accordance with either claim 1 or 2, wherein the finished product is a plate.

9. The method in accordance with either claim 1 or 2, wherein the finished product is a wire.

10. The method in accordance with either claim 1 or 2, wherein the finished product is a rod.

11. The method in accordance with either claim 1 or 2, wherein the finished product is a disk.

12. The method in accordance with either claim 1 or 2, wherein the finished product is a bar.

13. The method in accordance with either claim 1 or 2, further comprising the step of fabricating the finished product to a finished part.

14. The method of claim 13, wherein the finished part is a sputtering target.

15. The method of claim 13, wherein the finished part is a seamless complex curved form.

16. The method of claim 13, wherein the finished part is a disk.

17. A method of making sheet bar and other precursors of formed products to be made by extensive working comprising the steps:

providing a niobium metal as a powder under 300 PPM oxygen content of non-spherical particles, compacting the powder into a coherent precursor form of at least 25 pounds, and fabricating the precursor to a finished product form.

18. The method in accordance with claim 17, wherein multiple species of metals are provided in powder form as a mixture, wherein the multiple species include at least one higher melting metal and one lower melting metal to produce an alloy or micro-composite of the metals as worked, and the higher melting metal is the niobium metal.

19. The method in accordance with either claims 17 or 18, providing the powder under 200 PPM oxygen content.

20. The method in accordance with either claim 17 or 18, providing the powder under 100 PPM oxygen content.

* * * * *